United States Patent [19]

Gralak

[11] 4,006,254
[45] Feb. 1, 1977

[54] PROTEIN SUPPLEMENTED, FLAVORED INSTANT GRITS

[75] Inventor: Bruce George Gralak, Carpentersville, Ill.

[73] Assignee: The Quaker Oats Company, Chicago, Ill.

[22] Filed: Jan. 8, 1975

[21] Appl. No.: 597,505

Related U.S. Application Data

[63] Continuation-in-part of Ser. No. 408,864, Oct. 23, 1973, abandoned.

[52] U.S. Cl. .............................. 426/72; 426/620; 426/640; 426/658; 426/641; 426/311
[51] Int. Cl.² .......................................... A23L 1/30
[58] Field of Search .......... 426/620, 72, 543, 619, 426/640, 641, 541, 543, 656, 658, 650, 311

[56] References Cited

UNITED STATES PATENTS

| | | | |
|---|---|---|---|
| 3,391,001 | 7/1968 | Sair | 426/656 |
| 3,526,512 | 9/1970 | Calleus et al. | 426/620 |
| 3,615,656 | 10/1971 | Alden | 426/533 |
| 3,642,490 | 2/1972 | Hawley | 426/459 |
| 3,711,301 | 1/1973 | Asogawa | 426/92 |

*Primary Examiner*—Raymond N. Jones
*Attorney, Agent, or Firm*—Mathew R. P. Perrone, Jr.; Donnie Rudd

[57] ABSTRACT

An instant-type food product of the corn grits type is produced by: (A) admixing corn grits, water, a polysaccharide gum, vitamins, antioxidant and an emulsifier selected from the group polyoxyethylene sorbitan monostearate, polyoxyethylene sorbitan mono-oleate, glyceryl monostearate, and a mixture of monoglycerides and diglycerides of edible fats, oils, and fat-forming fatty acids; (B) heating the mixture to a specified temperature range; (C) drying the heated mixture by forming a thin sheet on a drum drier; (D) comminuting the cooked, dried sheet; (E) forming a moist proteinaceous material, and (F) blending the grits with the moist proteinaceous material to form a dry mixture.

12 Claims, No Drawings

PROTEIN SUPPLEMENTED, FLAVORED INSTANT GRITS

CROSS REFERENCE TO RELATED APPLICATIONS

This application is a continuation-in-part of U.S. patent application Ser. No. 408,864, filed Oct. 23, 1973, now abandoned.

BACKGROUND OF THE INVENTION

1. Field of the Invention

This invention pertains to a process for producing an instant food product of the corn grits type and the product produced by such process.

2. Description of the Prior Art

This invention constitutes one of the first known protein supplemented, flavored instant-type food product and process for a corn grits product. An instant corn grits product has been disclosed by U.S. Pat. No. 3,526,512. The present invention discloses a way of greatly increasing the flavor of such a product while at the same time providing added nutritional value in the form of protein supplementation.

SUMMARY OF THE INVENTION

It is an object of this invention to produce a protein supplemented, flavored instant corn grits product which may be prepared as highly nutritious, flavored corn grits by the mere addition of warm water to the product in a serving bowl.

It is another object of this invention to provide an instant grits product which upon the addition of warm water acquires the texture and flavor characteristics of blends of conventional corn grits and other products.

It is still a further object of this invention to provide a process for providing a protein and vitamin supplemented, flavored instant corn grits product.

These objects are accomplished by a process which comprises admixing corn grits, specified amounts of water, critical amounts of a polysaccharide gum, vitamins and antioxidant, and specified amounts of an emulsifier, heating the mixture above 71° C., drying the heated mixture by forming a thin sheet on a drum drier, collecting the dried sheet, comminuting it to form an instant-type food product, preparing a moist proteinaceous material, and blending the grits with specified amounts of the moist proteinaceous flavoring material to form a dry mixture.

More particularly, the polysaccharide gums used in this invention must be capable of hydrating rapidly with the addition of water and must be edible. Edible polysaccharide gums include both tru gums of vegetable origin and synthetic gums such as carboxymethylcellulose, methyl cellulose and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents.

A general classification of such gums is as follows:

A. Plant gums — dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

B. Plant mucilages — derived from seeds, roots or other plant parts usually by extraction with water. This class includes gums derived from althea root, chia seed, Iceland moss, linseed (flaxseed), slippery elm bark and guar gum.

C. Mucilaginous materials known as hydrophylic colloids obtained from two general groups of brown and red algae. This class includes agar, Irish moss (carrageen) and algin.

When the source material for the gum is acidic, i.e., algin and Irish moss, the commercially available edible gum is a derivative of the acid such as a soluble salt or ester, i.e., propylene glycol ester of alginic acid. In general, to be satisfactory, any gum employed must be edible, have no undesirable flavor, and disperse rapidly in hot water.

Likewise, the emulsifier used with this invention must possess certain properties. It must be edible and have no undesirable flavor. Among the emulsifiers that we have found to exhibit these properties and be acceptable for use in this invention are polyoxyethylene sorbitan monostearate, polyoxyethylene sorbitan mono-oleate, glyceryl monostearate, and a mixture of monoglycerides and diglycerides of edible fats, oils, and fat-forming fatty acids.

By reference to a mixture of monoglycerides and diglycerides of edible fats, oils, and fat-forming fatty acids, the reference is to a commercial product known as Atmos 300 (Atlas Chemical Industries, Inc.) or to a mixture of these components which approaches the hydrophilic-lipophilic balance of the commerical product, i.e., HLB of about 2.8.

The concentrations of both the polysaccharide gum and the emulsifier are important. The polysaccharide gum must be present in an amount of from 0.5 to 3.5 percent by weight of the finished corn grits product and preferably from 1.0 to 3.0 percent by weight of the finished corn grits product. The emulsifier should be present in an amount of from 10 parts per million to 2 percent by weight based on the weight of the finished corn grits product when less than 10 percent by weight of the grits have a particle size sufficient to pass through a U.S. No. 25 screen, and the emulsifier should be present in an amount of from 50 parts per million to 2 percent by weight based on the weight of the finished corn grits product (and preferably from 50 to 75 parts per million) when greater than 10 percent by weight of the grits have a particle size sufficient to pass through a U.S. No. 25 screen.

It is contemplates, alternatively, that mixtures of the aforementioned gums may be employed instead of a single gum as long as the critical levels of gum are maintained.

Likewise, it is contemplated, alternatively, that mixtures of the aforementioned emulsifiers may be employed instead of a single emulsifier in this invention as long as the critical levels of emulsifier are maintained.

The objects of this invention are further accomplished by a process for producing a fortified, nutritional instant-type food product which upon the addition of water and without need for heating to boiling temperatures acquires the flavor and texture characteristics of cooked corn grits, said process comprising the steps:

A. admixing
 1. corn grits;
 2. water, said water being added in an amount sufficient to cause the moisture content to be from 50 percent to 90 percent by weight of the total mixture;
 3. an edible polysaccharide gum capable of rehydrating rapidly with the addition of water, said gum being added in an amount of 0.5 to 3.5 percent by weight of the finished corn grits product;
 4. an emulsifier comprising a member selected from the group consisting essentially of polyoxyethylene sorbitan monostearate, polyoxyethylene sorbitan mono-oleate, glyceryl monostearate, and a mixture of monoglycerides and diglycerides of edible fats, oils, and fat forming fatty acids, said emulsifier being added in an amount of from 10 parts per million to 2 percent by weight based on the weight of the corn grits when less than 10 percent by weight of the grits have a particle size sufficient to pass through a U.S. No. 25 screen, and said emulsifier being present in an amount of from 50 parts per million to 2 percent by weight based on the weight of the corn grits when greater than 10 percent by weight of the grits have a particle size sufficient to pass through a U.S. No. 25 screen; and
 5. a mixture of vitamins and antioxidant until the total admixture is a slurry;
B. heating the above mixture until the temperature of the mixture is above 71° C.;
C. drying the heated mixture in the form of a thin sheet on a drum drier;
D. collecting the dried sheet of product containing discrete particles in a starch matrix and comminuting the dried sheet to form an instant-type corn grits product; and
E. forming a moist proteinaceous flavoring material by admixing:
 1. a proteinaceous material having more than 15 percent by weight protein therein,
 2. salt, and
 3. a moisturizing gravy mix; and
F. blending the moist proteinaceous flavoring material with the comminuted dry sheet until the blend is dry and with said proteinaceous flavoring material being added in an amount of from 1 percent to 15 percent by weight of the blended product.

While it is not necessary, it is preferred to add the emulsifier, 50 parts by weight water, and 50 parts by weight of an edible oil such as corn oil.

The temperature to which the product must be raised by heating is critical, and must be above the gelatinization point of the starch in the grain, i.e., about 71° C. (160° F.), but the temperature must not exceed a point at which degradation of the grits occurs, i.e., about 121° C. (250° F.).

Any of the commercially available comminuting machines are generally acceptable for comminuting the cooked and dried sheet of discrete particles in a starch matrix. It is preferred, however, that the comminution be such that the product has the following particle size distribution according to a Ro-Tap particle size distribution analysis:

| 10 MINUTES ON RO-TAP (No. refers to U.S. sieve numbers) (% refers to weight percent) | |
|---|---|
| On a No. 12 | Less than 1% |
| Through a No. 12 and on a No. 16 | 17% to 25% |
| Through a No. 16 and on a No. 20 | 37% to 43% |
| Through a No. 20 and on a No. 30 | 14% to 19% |
| Through a No. 30 and on a No. 40 | 4% to 7% |
| Through a No. 40 | Less than 20% |

While the above is a preferred particle size distribution for the comminuted product, any particle size distribution which will give approximately the same hydration rate as the above distribution will be acceptable.

In addition to making this product instant in nature, this unique process has achieved several other benefits. First, the combination of additives has provided a mixture which will form a sheet on a drum drier. By "drum drier" it is intended to mean any endless plate which can be heated from a side opposite the side contacted by the product. Normally, one would not attempt to use a drum drier to dry a mixture of discrete particles in a starch matrix. This is so because the discrete particles would cause voids or tears in the attempted sheet, resulting in an uneven mass rather than a thin, continuous and consistent sheet which could be subjected to uniform drying and heat treatment. This unique combination of additives has made possible the drying of the product on a drum drier which gives the desired properties of the product.

By the term "drying" as used herein, it is intended to mean reducing the water content to below 10 percent by weight.

The product, as formed on the drum drier, preferably has a thickness of from 0.030 to 0.040 inch. This can be accomplished by setting the space between the drums at from 0.020 to 0.025 inch, the increase in product thickness being attributed to "memory" or the ability of the material to recover part of its previous position.

Another distinct advantage of this process is that it is successful for corn grits from a wide variety of sources. Ordinarily, corn grits vary in makeup (fat content, etc.) depending on the location from which they are produced and the processing employed in making the grits. As a result of this, processes involving corn grits normally require major alteration to adjust to the changes in the grits. It has been found, however, that only a minor adjustment is necessary for this process. This new combination of additives has provided the unexpected result that regardless of the source of corn grits can produce an excellent product merely by adding in the process a polysaccharide gum and by adding from 50 parts per million to 2 percent by weight based on the weight of the corn grits of an emulsifier whenever the grits are found to have a particle size such that more than 10 percent by weight of the grits will pass through a U.S. No. 25 screen, and adding from 10 parts per million to 2 percent by weight emulsifier when less than 10 percent by weight of the grits will pass through a U.S. No. 25 screen.

Still another advantage of this new combination of additives becomes apparent after the product is prepared for use. When conventional corn grits are prepared in large quantities and stored on a steam table or the like to keep them warm until serving, they soon become an adhesive mass or cake and lose the texture associated with grits. This process, however, has provided a corn grits product wherein the forming of an adhesive mass or cake is postponed several hours. This results in a product which retains the grits texture for the longest of normal serving times for the product.

By the term "corn grits" in reference to this food product, it is intended to refer to particles of the endosperm of corn which have been subdivided to the extent that not less than 95 percent by weight of the particles pass through a No. 10 sieve and not more than 20 percent by weight of the particles pass through a No. 25 sieve.

By the term "instant" in reference to this food product, it is intended to refer to a product which can be prepared in a bowl by mere addition of water and without a cooking step by the consumer. This invention thus provides a product which eliminates the cooking pan and extensive cooking time required for conventional corn grits. While room temperature water (about 25° C.) can be added to this product to rehydrate it, it is preferred to use boiling water as this requires less time and provides a product at the temperature normally preferred.

This new and unique flavored product comprises a blend of the hereinabove described instant grits product with a moist, proteinaceous flavoring material. The moist, proteinaceous flavoring material comprises from 1–15 percent by weight of the blended product and the proteinaceous flavoring material has at least about 15 percent by weight protein therein. The proteinaceous flavoring material of this invention is moist. That is, it contains up to at least about 15 percent by weight moisture therein rather than being substantially dry, i.e. below 5 percent by weight moisture. It is preferable in this invention to use a vegetable protein material flavored with a meaty flavor. Primarily of importance are the hydrolyzed vegetable proteins impregnated with meaty flavors. For instance, the proteinaceous material can be prepared by mixing a blend of commonly known imitation bacon pieces with a redeye gravy mix and then with salt and mixing this mixture with the grits. Textured vegetable proteins impregnated with bacon or ham flavor are particularly useful in this invention. For use in this invention the proteinaceous material that is impregnated with a meat flavor or other proteinaceous material is mixed with salt and with a gravy. The gravy can be a redeye gravy mix which is a dried gravy with added smoked flavor, or in the case of added uncooked cheese or other such material, the gravy mixture can simply be water and starch or any moisturizing food material. Of great importance in this invention is the use of uncooked cheese as an additive. In this case the cheese cannot be cooked prior to being dry blended. When cheese is used it is crumbled and water added along with salt for moisture and mixing and then this is dry blended with the grits material to give an overall mixture. The limitations on the product are clearly defined. The flavoring ingredient must be about 1 percent by weight in order to provide sufficient flavoring in the material but it must not exceed about 15 percent by weight because it changes the texture characteristics if it gets too high. In addition, the product must be flavored with a material that imparts at least a sufficient amount of protein therein. It is required in this product that the additive portion of the product have at least 15 percent by weight protein therein. Textured vegetable proteins or hydrolyzed vegetable proteins commonly on the market generally have about 30 percent by weight protein therein although concentrates may have a much higher percentage of protein. The percentage of protein in cheese products is dependent upon the type cheese used and generally any cheese is acceptable so long as it meets the criteria and is uncooked.

Overall, the moist gravy material adds moisture to the proteinaceous material which as a moist material is then dry blended until the overall instant grits product is dry. The resultant product is a high quality, proteinaceous material that is very highly acceptable as a food product.

The corn grits, water and polysaccharide gum are mixed with a mixture of vitamins and antioxidant in preparation of the product of this invention. It is necessary that the vitamins be admixed prior to the slurring of the material in order to get a thorough mixture of the vitamins therein. Acceptable vitamins are vitamins C, A, and the B complexes as well as other vitamins used for supplementation of food products. Iron and other certain minerals may also be added. It is necessary, however, that any of the vitamins be mixed with an effective amount of antioxidant in order to prevent their oxidation and rancidity or decomposition in the heating step of the process. Of particular importance as antioxidants in this invention are BHA and BHT.

The unusual advantages of this process and the unique feature thereof is that the process requires that the vitamins be admixed prior to the heating step, a step which normally one would think should be at the end of the process to prevent degradation of the vitamins. On the other hand, the proteinaceous material must be prepared separately and independently as a moist product and then blended to give a dry product at the end. It is in no way obvious to give the reverse adding of vitamins at the first of the process and the protein at the end of the process and this discovery has made this new and unique invention important. It is important that the adding of the vitamins and the proteinaceous material not be in anyway deviated from or else a poor product will exist.

This new and unique process results in a product which cannot be produced by any other method. Simple mixing of the ingredients fails to produce an acceptable product. Likewise, simple mixing of the ingredients and cooking in a pan or oven fails to produce an acceptable product. Therefore, the new and useful product of this invention can be produced only by the new and unique process.

DESCRIPTION OF THE PREFERRED EMBODIMENTS

This invention will be further illustrated but is not limited by the following examples and preferred embodiments.

EXAMPLE 1

An emulsion is prepared by mixing 100 parts by weight corn oil, 100 parts by weight water, and 1 part by weight polyoxyethylene sorbitan mono-oleate (Tween 80, Atlas Chemical Industries, Inc.). This mixture is heated to 160° F. and homogenized at 1000-2000 psi to form a homogeneous emulsified mixture.

Two parts by weight corn grits, having a particle size such that 17 percent by weight of the grits passed through a U.S. No. 25 screen, and three parts by weight water are added to a batch mixer. An amount of the above-defined emulsified mixture is added so that concentration of the polyoxyethylene sorbitan mono-oleate is 50 parts per million based on the weight of the corn grits. Next, 0.028 part of carboxymethyl cellulose (CMC7HOF, Hercules, Inc.) is added along with 0.001 parts by weight vitamins, minerals (iron) and BHA. The components are then mixed thoroughly until a uniform mixture is obtained. The mixture at this point is at room temperature, i.e. about 25° C. (77° F.). The mixture (slurry) is then passed through a steam injector and steam is injected into it until it is at a temperature of about 80° C. (176° F.). The mixture at this point has viscosity characteristics approaching that of prepared corn grits. The steam-treated mixture is placed on an internally-heated, rotating double drum drier in a thin sheet. The product is then removed in a thin sheet having a thickness of about 0.035 inch and comminuted to the particle size of corn grits. A red-eye gravy is prepared by conventional methods and dried to about 15 percent by weight moisture. This mix is then mixed with an imitation bacon material (a smoked, bacon-flavored, hydrolyzed soy protein resembling chopped fried bacon) and salt in an amount of 12 parts gravy, 12 parts protein (bacon mix) and 5 parts salt. This mix is then mixed with the dried grits in an amount of 94 parts by weight dried grits with 6 parts by weight total protein mix.

EXAMPLE 2

Example 1 is repeated with the exception that the emulsifier is polyoxyethylene sorbitan monostearate (Tween 60, Atlas Chemical Industries, Inc.).

EXAMPLE 3

Example 1 is repeated with the exception that the emulsifier is glyceryl monostearate (Myvaplex Type 600, Distillation Products Industries).

EXAMPLE 4

Example 1 is repeated with the exception that the emulsifier is a mixture of monoglycerides and diglycerides of edible fats, oils and fat-forming fatty acids (Atmos 300, Atlas Chemical Industries, Inc.).

EXAMPLE 5

Example 1 is repeated with the exception that the polysaccharide gum is guar gum (Jaguar J2Sl, Stein, Hall and Co., Inc.).

EXAMPLE 6

Example 1 is repeated with the exception that the imitation bacon product is replaced with an equal amount of a bacon flavored, textured vegetable protein which is finely divided to resemble chopped, fried bacon.

EXAMPLE 7

Example 1 is repeated with the exception that the bacon product is replaced with 3 parts by weight of a ham flavored hydrolyzed soy protein. The ham flavored product is also finely divided to resemble small cubes of baked ham.

EXAMPLE 8

Example 1 was repeated with the exception that the bacon is replaced with about 9 parts by weight of an imitation sausage which has about half flavoring therein with the other half comprising a textured vegetable protein.

EXAMPLE 9

Example 1 is repeated with the exeption that the bacon bits are replaced with about 8 parts by weight of cheddar cheese and the gravy is replaced with a water corn starch mixture.

While guar gum and polyoxyethylene sorbitan monooleate are used in some of these examples as the thickening agent and emulsifier respectively, any of the polysaccharide gums and emulsifiers hereinbefore defined are acceptable for use in this process in making an instant corn grits product.

The products of Examples 1–5 were tested as instant corn grits by employing the following recipe:

Place ¼ cup (about 24.0 grams) of the corn grits product of this invention in a bowl. Pour ½ cup water (preferably boiling) over the product and stir until blended. Season to taste.

In each of the above examples the product thus produced was an extremely good tasting, high protein, vitamin and iron containing grits product. The product had the appearance and taste of grits mixed with another ingredient. The grits and "meat" product thus produced is the first known example of such a product which is high in protein, vitamins, and iron.

It may thus be seen that a new and useful process which produces a new and unique product has been invented.

Therefore, it is claimed:

1. A process for producing a fortified, nutritional instant-type food product which upon the addition of water and without need for heating to boiling temperatures acquires the flavor and texture characteristics of cooked corn grits, said process comprising the steps:
   A. admixing
      1. corn grits;
      2. water, said water being added in an amount sufficient to cause the moisture content to be from 50 percent to 90 percent by weight of the total mixture;
      3. an edible polysaccharide gum capable of rehydrating rapidly with the addition of water, said gum being added in an amount of 0.5 to 3.5 percent by weight of the finished corn grits product;
      4. an emulsifier comprising a member selected from the group consisting essentially of polyoxyethylene sorbitan monostearate, polyoxyethylene sorbitan mono-oleate, glyceryl monostearate, and a mixture of monoglycerides and diglycerides of edible fats, oils, and fat forming fatty acids, said emulsifier being added in an amount of from 10 parts per million to 2 percent by weight based on the weight of the corn grits when less than 10 percent by weight of the grits have a particle size sufficient to pass through a U.S. No. 25 screen, and said emulsifier being present in an amount of from 50 parts per million to 2 percent by weight based on the weight of the corn grits when greater than 10 percent by weight of the grits have a particle size sufficient to pass through a U.S. No. 25 screen; and
      5. a mixture of vitamins and antioxidant until the total admixture is a slurry;

B. heating the above mixture until the temperature of the mixture is above 71° C but not exceeding a point at which degradation of the grits occurs;
C. drying the heated mixture in the form of a thin sheet on a drum drier;
D. collecting the dried sheet of product containing discrete particles in a starch matrix and comminuting the dried sheet to form an instant-type corn grits product;
E. forming a moist proteinaceous flavoring material by admixing:
 1. a proteinaceous material having more than 15 percent by weight protein therein,
 2. salt, and
 3. a moisturizing gravy mix; and
F. blending the moist proteinaceous flavoring material with the comminuted dry sheet until the blend is dry and with said proteinaceous flavoring material being added in an amount of from 1 percent to 15 percent by weight of the blended product.

2. A process according to claim 1 wherein the edible polysaccharide gum that is added is carboxymethyl cellulose.

3. A process according to claim 1 wherein the edible gum that is added is guar gum.

4. A process as in claim 1 wherein the emulsifier that is added is polyoxyethylene sorbitain monostearate.

5. A process as in claim 1 wherein the emulsifier that is added is polyoxyethylene sorbitain mono-oleate.

6. A process as in claim 1 wherein the emulsifier that is added is glyceryl monostearate.

7. A process as in claim 1 wherein the edible polysaccharide gum that is added is carboxymethylcellulose and the emulsifier that is added is polyoxethylene sorbitan mono-oleate.

8. A process as in claim 1 wherein the proteinaceous flavoring material is a meat flavored vegetable protein.

9. A process as in claim 8 wherein the vegetable protein is a hydrolyzed vegetable protein.

10. A process as in claim 8 wherein the vegetable protein is textured vegetable protein.

11. A process as in claim 1 wherein the proteinaceous flavoring material is uncooked cheese.

12. A product produced by the process as defined in claim 1.

* * * * *